United States Patent
Ocampo et al.

(10) Patent No.: US 11,433,376 B2
(45) Date of Patent: Sep. 6, 2022

(54) MIXED OXIDE WITH ENHANCED RESISTANCE AND NOX STORAGE CAPACITY

(71) Applicant: RHODIA OPERATIONS, Paris (FR)

(72) Inventors: Fabien Ocampo, Audun-le-Tiche (FR); Naotaka Ohtake, Tokushima (JP)

(73) Assignee: RHODIA OPERATIONS, Paris (FR)

( * ) Notice: Subject to any disclaimer, the term of this patent is extended or adjusted under 35 U.S.C. 154(b) by 267 days.

(21) Appl. No.: 16/612,642

(22) PCT Filed: May 8, 2018

(86) PCT No.: PCT/EP2018/061772
§ 371 (c)(1),
(2) Date: Nov. 11, 2019

(87) PCT Pub. No.: WO2018/206531
PCT Pub. Date: Nov. 15, 2018

(65) Prior Publication Data
US 2020/0197910 A1    Jun. 25, 2020

(30) Foreign Application Priority Data
May 11, 2017   (EP) .................................. 17170729

(51) Int. Cl.
| B01J 23/00 | (2006.01) |
| B01J 23/10 | (2006.01) |
| B01J 35/10 | (2006.01) |
| B01J 37/03 | (2006.01) |
| B01J 37/08 | (2006.01) |
| F01N 3/08 | (2006.01) |
| F02D 41/02 | (2006.01) |

(52) U.S. Cl.
CPC ............. *B01J 23/002* (2013.01); *B01J 23/10* (2013.01); *B01J 35/1014* (2013.01); *B01J 37/031* (2013.01); *B01J 37/08* (2013.01); *F01N 3/0814* (2013.01); *F01N 3/0842* (2013.01); *F02D 41/0275* (2013.01)

(58) Field of Classification Search
None
See application file for complete search history.

(56) References Cited

U.S. PATENT DOCUMENTS

| 4,940,685 A * | 7/1990 | Sauvion ................ C01F 17/32 |
| | | 502/263 |
| 2007/0148072 A1* | 6/2007 | Okamoto ............... C01G 25/00 |
| | | 423/263 |
| 2010/0329954 A1* | 12/2010 | Yokota ................. C01F 17/241 |
| | | 423/213.2 |
| 2014/0187415 A1* | 7/2014 | Ohtake .................... B01J 23/10 |
| | | 502/242 |
| 2017/0274355 A1* | 9/2017 | Psaras ................. B01J 35/1014 |
| 2017/0333877 A1* | 11/2017 | Titlbach .............. B01J 35/1014 |
| 2018/0304235 A1* | 10/2018 | Harris ................. B01J 35/1038 |

* cited by examiner

*Primary Examiner* — Colin W. Slifka
*Assistant Examiner* — Michael Forrest
(74) *Attorney, Agent, or Firm* — Osha Bergman Watanabe & Burton LLP

(57) ABSTRACT

The present invention relates to a mixed oxide with enhanced resistance and $NO_x$ storage capacity. The mixed oxide may be used as a component of a $NO_x$ trap material in an exhaust system of an internal combustion engine. The invention also relates to a method for treating an exhaust gas from an internal combustion engine using the mixed oxide.

19 Claims, No Drawings

MIXED OXIDE WITH ENHANCED RESISTANCE AND NOX STORAGE CAPACITY

The present application is a U.S. national stage entry under 35 U.S.C. § 371 of International Application No. PCT/EP2018/061772 filed May 8, 2018, which claims the priority of European patent application EP 17170729 filed on May 11, 2017, the contents of which being entirely incorporated herein by reference for all purposes. In case of any incoherency between the present application and the EP application that would affect the clarity of a term or expression, it should be made reference to the present application only.

The present invention relates to a mixed oxide with enhanced resistance and $NO_x$ storage capacity. The mixed oxide may be used as a component of a catalytic composition, in particular in a lean $NO_x$ traps in an exhaust system of an internal combustion engine. The invention also relates to a method for treating an exhaust gas from an internal combustion engine using the mixed oxide.

TECHNICAL PROBLEM

Car exhaust primarily contains harmful gases such as carbon monoxide (CO), nitrogen oxides (NO and $NO_2$), and hydrocarbons. Environmental concerns and government regulations have led efforts to remove these noxious combustion products from vehicle exhaust by conversion to more benign gases such as carbon dioxide ($CO_2$), nitrogen ($N_2$), and water ($H_2O$). In order to accomplish this conversion, the exhaust gases must pass through a treatment system that contains a catalytic composition that can oxidize CO to $CO_2$, reduce NO to $N_2$, and oxidize hydrocarbons to $CO_2$ and $H_2O$. For a significant number of gasoline (petrol) engine vehicles, this is achieved using the so-called "three-way" catalyst, which can simultaneously decrease the levels of hydrocarbons, CO and $NO_x$; see for example U.S. Pat. Nos. 8,968,690, 8,617,496, 9,040,003.

However, in the case of diesel engines or petrol engines that run on a fuel-lean, hereafter lean mixture, "three-way" catalysts are unsuitable with respect to the conversion of $NO_x$ to $N_2$. These engines have excess oxygen present in the exhaust gas, with respect to the standard stoichiometric point of conventional gasoline engines. The presence of this 'excess' oxygen results in the preferential conversion of reductants such as CO or $H_2$ by $O_2$ resulting in a complete depletion of the reductant species required for catalytic conversion NO to $N_2$. One solution to this problem has been the use of lean $NO_x$ traps (or LNTs) e.g. EP 0573672, U.S. Pat. Nos. 7,3750,56, 8,592,337. Recently, lean-burn gasoline and diesel engines have increased in popularity due to their improved fuel economy.

The principle of operation of a LNT is based upon dual modes of exhaust stoichiometry. In the first mode, the engine is operated under lean conditions, thereby providing increased fuel economy, during this time the Pt or Pt/Pd oxidation catalyst sites of the LNT convert some of the incoming nitric oxide (NO) into nitrogen dioxide (see Catal Lett 2009, 130, 121-129), these nitrogen oxides ($NO_x$=NO and $NO_2$) are adsorbed on the so-called trapping materials present in the LNT, typically a Ba-containing and Ce-containing components amongst others e.g. see Chem. Rev. 2009, 109, 4054-4091, Catal Lett 2009, 127, 55-62, App Cat B: Env 2008, 84, 545-551, US 2017/0100707, US 2017/0009623 to form quasi-stable nitrates and nitrites, thus limiting emission of $NO_x$ to the environment. However, with time of operation (a few minutes) the trapping materials present in the LNT, become saturated the trapping efficiency for $NO_x$ decreases below acceptable emission targets. At this point, the engine operation map switches to the second mode of operation and extra fuel is injected into the engine and the net stoichiometry of the exhaust becomes fuel-rich, hereafter, rich. Under these rich conditions, the nitrates and nitrites decompose, releasing $NO_x$ which is subsequently and rapidly reduced to $N_2$ over other active platinum group metal sites, typically Rh, within the LNT. LNTs are therefore based on a complex mechanism for which the $NO_x$ are, in a first step, stored—essentially in the form of nitrates/nitrites on the surface of the catalyst—and then converted into nitrogen in a second step. This conversion is especially obtained by modifying the running regime of the engine so as to increase the richness of the mixture and thus fall into a rich, reductive medium that is favorable for converting the $NO_x$ into nitrogen. The successful operation of a LNT thus is dependent upon the development of active and stable trapping materials with maximal $NO_x$ uptake capacity. LNTs are typically composed of one or more platinum group metals (PGMs) such as platinum, palladium, or rhodium, and an alkali earth metal such as barium. Although these traps are effective at removing NO from the exhaust of lean-burn vehicles, high loadings of expensive PGMs are required. As such, there is a significant cost associated with the use of these LNTs.

Cerium-based oxides such as HSA20 commercialized by Solvay are already known as components of LNTs. One of the required properties of a LNT and of a cerium based component of a LNT is high thermal stability. However, more stringent regulations like Euro6b or Euro6c will require LNTs which are more efficient at low temperature. A higher thermal stability is also required in more severe conditions such as hydrothermal conditions and/or lean/rich conditions.

ABOUT THE INVENTION

The invention relates to a cerium-based mixed oxide that can be used as a component of a LNT. The mixed oxide exhibits good thermal resistance under a calcination in air and under severe conditions while maintaining good $NO_x$ storage capacity despite the severe aging.

TECHNICAL BACKGROUND

WO 2013/092557 discloses mixed oxides based on cerium, aluminium and barium which may also contain zirconium. WO 2013/092560 discloses mixed oxides based on cerium (Ce), silicon (Si) and barium (Ba). EP 2724776 discloses mixed oxides based on cerium and silicon. The mixed oxide of the present invention does not comprise barium nor silicon.

U.S. Pat. No. 6,228,799 B1 discloses mixed oxides based on cerium and zirconium which exhibit a specific surface of at least 40 $m^2/g$ after calcination at 900° C. for 6 hours and a specific surface of at least 14 $m^2/g$ after calcination at 1000° C. for 6 hours. All examples are based on mixed oxides with a zirconium content higher than 20.0%.

WO 2012/004263 discloses mixed oxide based on cerium, zirconium and niobium. The specific surface areas after calcination in air at 900° C. and 1000° C. are lower.

US 2015/0165418 discloses cerium-based mixed oxides which may be used as LNT. The mixed oxide may be composed of Ce, CeZr, CeZrLa, CeZr or mixture of them. There is no disclosure of the improved properties as in claim 1.

US 2015/0190793 discloses a $NO_x$ trap material which consists of a $NO_x$ storage component and a supporter. The $NO_x$ storage component consists of alkaline earth metal, alkali metal, rare earth metal, mixture of them. The supporter consists of Ce, CeZr, Al stabilized with rare earth, alkaline earth, transition metal.

EP 10803686 discloses a cerium-zirconium mixed oxide which may further contain one or more oxides of at least one selected from the group consisting of rare earth elements, transitional metal elements, aluminium and silicon. This application does not disclose the specific composition of claim 1.

DESCRIPTION OF THE INVENTION

The invention relates to a mixed oxide of cerium, zirconium and at least one rare-earth element other than cerium selected from Y, La, Pr, Nd and Gd, with the following proportions by weight, expressed as oxides:
zirconium: up to 20.0%;
the rare-earth element(s) other than cerium: up to 20.0%;
the remainder as cerium, the proportion of cerium being at least 70.0%, more particularly at least 80.0%, even more particularly at least 85.0%.

The mixed oxide comprises zirconium. The proportion of zirconium is up to 20.0%. It may for instance be at least 0.1%. It may also may be from 0.5% to 12.0%, more particularly from 1.0% to 12.0%.

The mixed oxide also comprises at least one rare-earth element other than cerium selected from Y, La, Pr, Nd and Gd (noted RE in the present application). The mixed oxide may comprise only one rare-earth element other than cerium. In that case, it is preferably lanthanum. The mixed oxide may also comprise a combination of two rare-earth elements other than cerium. In that case, it is preferably a combination of lanthanum and another rare-earth element selected from Y, Pr, Nd and Gd. The proportion of the rare-earth element(s) may be from 3.0% to 10.0%, more particularly from 3.0% to 6.0%.

The mixed oxide also comprises cerium. Among the elements Ce, Zr and RE, cerium is the main component of the mixed oxide. The proportion of cerium may be at least 70.0%, more particularly at least 80.0%, even more particularly at least 85.0%.

More particularly, the mixed oxide may be characterized by the following proportions:
zirconium: from 1.0% to 12.0%;
the rare-earth element(s) other than cerium: from 3.0% to 10.0%, more particularly from 3.0% to 6.0%;
the remainder as cerium, the proportion of cerium being at least 80.0%, more particularly of at least 85.0%.

According to an embodiment, the mixed oxide comprises only lanthanum as the rare-earth element other than cerium and the proportion of zirconium is from 4.0% to 6.0% and the proportion of lanthanum is from 4.0% to 6.0%. According to another embodiment, the mixed oxide comprises only lanthanum as the rare-earth element other than cerium and the proportion of zirconium is be from 9.0% to 11.0% and the proportion of lanthanum is from 3.0% to 5.0%.

A typical mixed oxide according to the invention is of the following composition (% by weight expressed as oxide): $Ce_{88.0\%-92.0\%} Zr_{4.0\%-6.0\%} La_{4.0\%-6.0\%}$. Another typical mixed oxide according to the invention is of the following composition (% by weight expressed as oxide): $Ce_{84.0\%-88.0\%} Zr_{9.0\%-11.0\%} La_{3.0\%-5.0\%}$.

The above mentioned elements Zr, La, RE, Ce are generally present in the mixed oxide as oxides. They may nonetheless be also present in the form of hydroxides or oxyhydroxides. The proportions of these elements are determined by the usual analytical methods like X-ray fluorescence. An XRF spectrometer PANalytical Axios-Max may for instance be used.

The mixed oxide comprises the above mentioned elements with the above mentioned proportions but it may also additionaly comprise other elements like impurities. The impurities may stem from the raw materials or starting materials used in the process of preparation of the mixed oxide. The total proportion of the impurities is generally lower than 0.1% by weight with respect to the mixed oxide. The mixed oxide may also comprise the element hafnium. This element is usually present in combination with zirconium in the ores which are present in the natural state. The relative proportion of hafnium with respect to zirconium depends on the ore from which zirconium is extracted. The relative proportion by weight Zr/Hf in some ores may be around 50/1. Thus baddeleyite contains roughly 98% of $ZrO_2$ and 2% of $HfO_2$. As for zirconium, hafnium is generally present as an oxide. It is not excluded though that hafnium is also present partly in the form of an hydroxide or oxyhydroxide. The proportion of hafnium is lower or equal to 2.5%, even lower or equal to 2.0%, this proportion being expressed by weight and by oxide with respect to the mixed oxide as a whole. The proportions of the impurities may be determined with Inductively Coupled Plasma Mass Spectrometry.

In the present application, the proportions of the elements are given or expressed by weight and by oxide ($CeO_2$, $ZrO_2$, $HfO_2$, $La_2O_3$, $RE_2O_3$, $Pr_6O_{11}$ in the case of Pr).

The specific surface areas are determined by adsorption of nitrogen according to well-known techniques. The method to measure the specific surface areas is well-known to the person skilled in the art. They are given in accordance with standard ASTM D 3663-03 (reapproved 2015). The method is laid down from the Brunauer-Emmett-Teller method (BET method) described in the periodical "The Journal of the American Chemical Society, 60, 309 (1938)". The specific surface areas are expressed for a designated calcination temperature and time. The specific surface areas are determined with an appliance Flowsorb II 2300 of Micromeritics according to the guidelines of the constructor. They may also be determined with a Macsorb analyzer model I-1220 of Mountech according to the guidelines of the constructor. Prior to the measurement, the samples are degassed under vacuum and by heating at a temperature of at most 200° C. to remove the adsorbed species. Conditions may be found in the examples.

The mixed oxide of the invention is characterized by its thermal resistance in classical conditions. It thus exhibits:
a specific surface area of at least 35 m$^2$/g, more particularly of at least 40 m$^2$/g, even more particularly of at least 42 m$^2$/g, after calcination in air at 900° C. for 5 hours; and
a specific surface area of at least 20 m$^2$/g, more particularly of at least 23 m$^2$/g, even more particularly of at least 25 m$^2$/g, after calcination in air at 1000° C. for 5 hours.

In other words, the mixed oxide of the invention exhibits a specific surface area of at least 35 m$^2$/g, more particularly of at least 40 m$^2$/g, even more particularly of at least 42 m²/g, after being calcined in air at 900° C. for 5 hours. It also exhibits a specific surface area of at least 20 m²/g, more particularly of at least 23 m²/g, even more particularly of at least 25 m²/g, after being calcined in air at 1000° C. for 5 hours.

The specific surface after calcination in air at 900° C. for 5 hours may range from 35 to 65 m²/g, more particularly from 40 to 65 m²/g, even more particularly from 42 to 65 m²/g. This specific surface may also range from 35 to 50 m²/g, more particularly from 40 to 50 m²/g, even more particularly from 42 to 50 m²/g.

The specific surface after calcination in air at 1000° C. for 5 hours may range from 20 to 40 m²/g, more particularly from 23 to 40 m²/g. This specific surface may also range from 20 to 35 m²/g, more particularly from 23 to 35 m²/g The mixed oxide may be also characterized by its resistance in more severe conditions (hydrothermal conditions and/or "lean/rich" conditions) which are now detailed below. To evaluate the resistance in hydrothermal conditions, the mixed oxide is aged at 800° C. for 16 hours in an atmosphere composed of 10.0 vol % $O_2$/10.0 vol % $H_2O$/the balance being $N_2$. The expression "balance being $N_2$" means that the balance to 100 vol % of the atmosphere is made of $N_2$. This means that this atmosphere is thus of the following composition: 10.0 vol % $O_2$/10.0 vol % $H_2O$ and 80.0 vol % $N_2$. These conditions or similar conditions are known in the field: see "Multi-component zirconiatitania mixed oxides: catalytic materials with unprecedented performance in the selective catalytic reduction of $NO_x$ with $NH_3$ after harsh hydrothermal ageing", Appl. Catal. B 2011, 105, 373-376. After such treatment, the mixed oxide exhibits a specific surface area of at least 45 m²/g, more particularly of at least 48 m²/g. The hydrothermal conditions may be as detailed in the examples. The specific surface under these conditions may range from 45 to 55 m²/g, more particularly from 48 to 55 m²/g To evaluate the resistance in "lean/rich" switching conditions, the mixed oxide is aged at 720° C. for 8 hours in an atmosphere which is alternatively:
  an atmosphere A1 composed of 2.7 vol % $O_2$/10.0 vol % $H_2O$/the balance being $N_2$ and applied for 90 seconds; then
  an atmosphere A2 composed of 2.7 vol % CO/10.0 vol % $H_2O$/the balance being $N_2$ and applied for another 90 seconds;
  the cycle of the alternating atmosphere A1-A2 being repeated for the whole 8 hours of the aging.

In other words, the mixed oxide is placed at 720° C. for 8 hours in an atmosphere which alternates between A1 for 90 s and A2 for 90 s. The cycle is applied during 8 hours and is thus the following: A1 (90 s), A2 (90 s), A1 (90 s), A2 (90 s), . . . (note that the cycle may start either with A1 or with A2 without any impact). By doing so, the atmosphere switches alternatively from A1 to A2 and vice versa. The cycle is operated for 8 hours. These "lean/rich" conditions may be as detailed in the examples. After such treatment under the cycles A1-A2, the mixed oxide exhibits a specific surface area of at least 35 m²/g, more particularly of at least 40 m²/g. The specific surface under these conditions may range from 35 to 60 m²/g, more particularly from 40 to 60 m²/g.

It must be clarified that the specific surface areas given in the present invention are given and measured independently of each other. Thus, for example, the measurement of the specific surface area after calcination in air at 1000° C. for 5 hours is not determined on a mixed oxide, the specific surface area of which has been measured after calcination in air at 900° C. for 5 hours.

After the treatment under the cycles A1-A2, the average size t of the crystallites of the mixed oxide is lower than 15 nm, more particularly lower than 13 nm, even more particularly lower than 10 nm. This size is determined from an X-ray diffractogram with the use of the Scherer formula. The Scherer formula below gives the average size t:

$$t \cdot = \frac{k \cdot \lambda}{\sqrt{H^2 - s^2} \cdot \cos\theta}$$

k: form factor taken as 0.9;
λ (lambda): wavelength of the radiation used 1.54 Angstrom;
H: width of the peak at half height of the considered reflexion;
s: instrumental width which depends on the appliance used and of the angle θ;
θ: Bragg angle.

The average size t is based on the most intense reflexion. This reflexion is located at $2\theta = 28.8° \pm 1°$ is selected. It usually corresponds to the (111) phase of the mixed oxide.

The mixed oxide also retains good $NO_x$ storage capacity even after the aging under severe conditions. This property is observed on the mixed oxide and on the mixed oxide with Pt (1.0% by weight). After the treatment under hydrothermal conditions detailed above, the mixed oxide with (1.0% by weight) or without platinum retains at least 13.0 pg $NO_x$/g mixed oxide over a period of 90 min. After the treatment under "lean/rich" conditions detailed above, the mixed oxide with (1.0% by weight) or without platinum retains at least 17.0 µg $NO_x$/g mixed oxide over a period of 90 min.

Porosity

After calcination in air at 900° C. for 5 hours, the total pore volume of the mixed oxide determined by a mercury porosimetry may be at least 0.35 mL/g.

The invention also relates to a particular mixed oxide consisting of or consisting essentially of a mixture of the oxides of cerium, of zirconium, of at least one rare-earth element other than cerium selected from Y, La, Pr, Nd and Gd, and optionally of the oxide of hafnium, with the following proportions by weight, expressed as oxides:
  zirconium: up to 20.0%;
  the rare-earth element(s) other than cerium: up to 20.0%;
  the remainder as cerium, the proportion of cerium being at least 70.0%, more particularly at least 80.0%, even more particularly at least 85.0%; characterized in that the mixed oxide exhibits:
  a specific surface area of at least 35 m²/g, more particularly of at least 40 m²/g, even more particularly of at least 42 m²/g, after calcination in air at 900° C. for 5 hours; and
  a specific surface area of at least 20 m²/g, more particularly of at least 23 m²/g, even more particularly of at least 25 m²/g, after calcination in air at 1000° C. for 5 hours;
  a specific surface area of at least 45 m²/g, more particularly of at least 48 m²/g, after aging at 800° C. for 16 hours in an atmosphere composed of 10 vol % $O_2$/10 vol % $H_2O$/the balance being $N_2$.

The expression "consisting essentially of" is to be interpreted as allowing the presence of other elements in addition to the mandatory elements, provided that the essential characteristics of the claimed composition are not materially affected by the presence of said other elements. All the technical features and embodiments previously disclosed also apply to this particular mixed oxide.

The invention also relates to a method for preparing a mixed oxide as previously disclosed comprising the following steps:

step (a): an aqueous solution comprising $Ce^{IV}$, optionally $Ce^{III}$, $H^+$ and $NO_3^-$ with a molar ratio $Ce^{IV}$/total cerium of at least 0.9 is heated at a temperature between 60° C. and 170° C., more particularly between 90° C. and 160° C., to obtain a suspension comprising a liquid medium and a precipitate;

step (b): the solid of the suspension obtained at the end of step (a) is allowed to settle and the liquid on the top is partly removed, the nitrate(s) of the rare earth element(s) is/are added to the suspension and water is optionally added to adjust the total volume;

step (c): the mixture obtained at the end of step (b) is heated;

step (d): an aqueous solution of zirconium oxynitrate is added to the mixture obtained at the end of step (c) and an aqueous solution of a basic compound is added to adjust the pH of the mixture to at least 7.0, more particularly between 8.0 and 9.0;

step (e): a precipitate is recovered from the mixture obtained at the end of step (d) and it is optionally dried to remove partly or completely the water which is present;

step (f): the solid obtained at the end of the step (e) is calcined in air at a temperature between 300° C. and 800° C.;

step (g): the solid obtained from step (f) is optionally ground to reduce the size of the particles;

wherein the process is characterized by a decrease ratio (DR) between 10% and 90%, more particularly between 30% and 50%, even more particularly between 35% and 45%, DR being given by formula (I):

$$DR=[NO_3^-]_{step\ b}/[NO_3^-]_{step\ a}\times 100 \qquad (I)$$

where $[NO_3^-]_{step\ a}$ is the concentration in mol/L of the nitrate anions in the aqueous solution of cerium used in step (a);

and $[NO_3^-]_{step\ b}$ is concentration in mol/L of the nitrate anions in the liquid medium of the suspension obtained at the end of step (b).

The method involves the use of an aqueous solution of $Ce^{IV}$ and optionally $Ce^{III}$ cations characterized by a molar ratio $Ce^{IV}$/total cerium of at least 0.9. This ratio may be 1.0. It is advantageous to use a salt of cerium with a purity of at least 99.5%, more particularly of at least 99.9%. An aqueous ceric nitrate solution can for instance be obtained by reaction of nitric acid with an hydrated cerix oxide prepared conventionally by reaction of a solution of a cerous salt and of an aqueous ammonia solution in the presence of aqueous hydrogen peroxide to convert $Ce^{III}$ cations into $Ce^{IV}$ cations. It is also particularly advantageous to use a ceric nitrate solution obtained according to the method of electrolytic oxidation of a cerous nitrate solution as disclosed in FR 2570087. A solution of ceric nitrate obtained according to the teaching of FR 2570087 may exhibit an acidity of around 0.6 N.

The water used to prepare the aqueous solution is preferably deionized water. The concentration of cerium expressed in terms of cerium oxide in the aqueous solution of cerium may be comprised between 5 and 150 g/L, more particularly between 30 and 60 g/L. As an example of concentration in terms of oxide, a concentration of 225 g/L of nitrate of cerium corresponds to 100 g/L of $CeO_2$. The amount of $H^+$ in the aqueous solution of cerium of $Ce^{IV}$ and optionally $Ce^{III}$ cations used in step (a) may be between 0.01 and 1.0 N, more particularly between 0.01 and 0.06 N. The acidity of the aqueous solution used in step (a) may be adjusted by the addition of $HNO_3$ and/or $NH_3$ (in the case of the addition of $NH_3$, the quantity of base added is just necessary to adjust the acidity without there being any precipitation).

Thus a typical aqueous solution of cerium contains $Ce^{IV}$, optionally $Ce^{III}$, $H^+$ and $NO_3^-$. The aqueous solution may be obtained by mixing the appropriate quantities of nitrate solutions of $Ce^{IV}$ and $Ce^{III}$ and by optionally adjusting the acidity. An example of an aqueous solution that may be used is disclosed in example 1.

In the first step (a), the aqueous solution of cerium is heated and held at a temperature between 60° C. and 170° C., more particularly between 90° C. and 160° C., so as to obtain a suspension comprising a liquid medium and a precipitate. The precipitate may be in the form of cerium hydroxide. Any reaction vessel may be used in step (a) without critical limitation, and either a sealed vessel or an open vessel may be used. Specifically, an autoclave reactor may preferably be used. The duration of the heat treatment is usually between 10 min and 48 hours, preferably between 30 min and 36 hours, more preferably between 1 hour and 24 hours. Without wishing to be bound by any particular theory, the function of this heating step is to improve the crystallinity of the precipitate which results in a better heat resistance of the mixed oxide. The conditions used in the examples may be applied.

In step (b), the concentration of the nitrate anions $NO_3^-$ present in the liquid medium is decreased by removing a part of the liquid medium from the suspension obtained at the end of step (a). This is performed by leaving the solid of the suspension settle and by removing partly the liquid on the top. After that, the nitrate(s) of the rare earth element(s) eg in the form of aqueous solution(s) is/are added to the suspension. Water may also be added to adjust the total volume. The amount of the nitrate(s) of the rare earth element(s) added depends on the targeted composition of the mixed oxide. It must be noted that, when removing some of the liquid from the suspension, some of the solid may be removed as well. In that case, the amount of the nitrate(s) of the rare earth element(s) is calculated by mass balance to take into account the amount of solid having been so removed.

The method is characterized by the decrease of the concentration of nitrate anions $NO_3^-$ in the liquid medium of the suspension obtained at the end of step (b) (that is after the removal of part of the liquid medium and the addition of the nitrate(s) and optionally water) in comparison to the concentration of $NO_3^-$ in the aqueous solution of cerium used in step (a). The decrease may be characterized by a decrease ratio (DR) between 10% and 90%, more particularly between 30% and 50%, even more particularly between 35% and 45%, wherein DR is given by formula (I):

$$DR=[NO_3^-]_{step\ b}/[NO_3^-]_{step\ a}\times 100 \qquad (I)$$

$[NO_3^-]_{step\ a}$: concentration in mol/L of the nitrate anions in the aqueous solution of cerium used in step (a);

$[NO_3^-]_{step\ b}$: concentration in mol/L of the nitrate anions in the liquid medium of the suspension obtained at the end of step (b) (that is after the removal of part of the liquid medium and the addition of the nitrate(s) and optionally of water).

To be more specific, DR is given by $(F/G)/(D/E)\times 100$.

1. Calculation of D which is the total number of nitrate anions $NO_3^-$ (mol) in the aqueous solution of cerium used in step (a). One must take into account the nitrate anions stemming from $Ce^{IV}$, optionally from $Ce^{III}$ and the nitrate anions stemming from $HNO_3$ if any.

2. Calculation of the concentration of the nitrate anions $NO_3^-$ (mol/L) in the aqueous solution of cerium used in step (a): $[NO_3^-]_{step\ a}$=D/E wherein E is the total volume (L) of the aqueous solution of cerium used in step (a).

3. Calculation of F which is the total number of nitrate anions $NO_3^-$(mol) in the liquid medium of the suspension obtained at the end of step (b) that is after the removal of part of the liquid medium and the addition of the nitrate(s) and optionally water. To calculate F, the amount of liquid removed in step (b) is taken into account along with the amount of the nitrate anions stemming from the nitrate(s) of the rare earth element(s).

4. Calculation of the concentration of nitrate anions $NO_3^-$ ions (mol/L) in the suspension obtained at the end of step (b): $[NO_3^-]_{step\ b}$=F/G wherein G is the total volume (L) of the solution at the end of step (b) after the addition of the nitrate(s) of the rare earth element(s) and optionally of water.

DR is usually calculated by mass balance taking into account the exact quantities of products added or removed from the tank. More precisely, D (mol)=A/172.12×[B/100×4+(100-B)/100×3]+C wherein:
A is the quantity of cerium cations in terms of $CeO_2$ (gram), at the start of step (a);
B is the percentage of tetravalent cerium cations per total cerium cations at the start of step (a);
C is the quantity of $HNO_3$ (mol) if any.
F (mol)=(D×removal ratio of the liquid medium)+anions $NO_3^-$(mol) from the nitrate(s) of the rare earth element(s) added.

The volumes E and G may be measured by a gauge.

In step (c), the mixture obtained at the end of step (b) is heated. In this step, the temperature of the mixture may be from 100° C. to 300° C., more particularly from 110° C. to 150° C. The duration of the heating may be from 10 min to 40 h, more particularly from 30 min to 36 h. The conditions of example 1 can be applied.

Then, in step (d), an aqueous solution of zirconium oxynitrate is added to the mixture obtained at the end of step (c). An aqueous solution of a basic compound is also added to adjust the pH of the mixture to at least 7.0, more particularly between 8.0 and 9.0. An aqueous ammonia solution may be added.

In step (e), a precipitate is recovered from the mixture obtained at the end of step (d) and it is optionally dried to remove partly or completely the water which is present. The recovery may be performed by separation of the liquid medium from the precipitate. Filter pressing, decantation or Nutsche filter may be used. The precipitate may optionally be washed with water, preferably water at a pH>7. An aqueous ammonia solution may be used.

In step (f), the solid obtained at the end of the step (e) is calcined in air at a temperature between 300° C. and 800° C. The duration of the calcination may vary from 1 to 20 hours. For instance, the solid may be calcined at a temperature of 400° C. for 10 hours. The conditions of example 1 may apply.

In step (g), the solid (mixed oxide) obtained from step (f) may be ground to reduce the size of the particles. Use can be made of a hammer mill. The powder may exhibit an average particle size $d_{50}$ between 0.05 and 50.0 µm. $d_{50}$ is obtained from a distribution in volume which is measured by laser diffraction. The distribution may be obtained for instance with a LA-920 particle size analyzed commercialized by Horiba, Ltd.

The method so disclosed is suitable for the preparation of the mixed oxide of the invention.

The mixed oxide of the invention is used as a component of a catalytic composition, more particularly of a LNT composition (that is a catalytic composition that can be used as a LNT). The invention thus also relates to a catalytic composition comprising at least one mixed oxide of the invention. The catalytic composition comprising the mixed oxide of the invention is usually applied on a support. The invention this also relates to a support on which is applied the catalytic composition. The support is preferably an inorganic support or a metallic support. The inorganic support may be made of any suitable refractory material, e.g. alumina, silica, titania, ceria, zirconia, magnesia, zeolites, silicon nitride, silicon carbide, zirconium silicates, magnesium silicates, aluminosilicates and metallo aluminosilicates (such as cordierite and spodumene). Cordierite, a magnesium aluminosilicate, and silicon carbide are particularly preferred. The metallic substrate may be made of any suitable metal, and in particular heat-resistant metals and metal alloys such as titanium and stainless steel as well as ferritic alloys containing iron, nickel, chromium, and/or aluminum in addition to other trace metals. The substrate is preferably a flow-through substrate or a filter substrate. Most preferably, the substrate is a flowthrough substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

An example of a catalytic composition comprises at least one mixed oxide according to the invention, at least one alumina (optionally doped), at least one catalytic metal selected from Pt, Pd and Rh and mixtures thereof, and optionally a material M based on an alkaline metal or an alkaline earth metal. The function of M is to store the nitrogen oxides in the form of nitrates. M may be an oxide, a carbonate or an hydroxide. M is preferably based on barium. A method of preparation of the catalytic composition consists in preparing a slurry comprising components of the catalytic composition of precursors of said components. A solution of the catalytic metal is added to the slurry and the mixture is dried and calcined in air to lead to a solid. Then, a solution of the precursor of material M is added to the obtained solid and the mixture is dried and calcined in air. A known example of precursor is barium acetate. The catalytic composition may thus be prepared according to the teaching of WO 2017/017258 or of US 2017/0100707.

Another example of a catalytic composition comprises a support and at least one layer applied on the support comprising the mixed oxide of the invention. The layer comprises at least a platinum group metal ("PGM"), the mixed oxide of the invention at least one inorganic material different from the mixed oxide. The PGM is selected from platinum, palladium, rhodium and mixtures thereof. The inorganic material may contain Ba, Ca, Sr, Mg, K, Li, Na, Cs, Al. The inorganic material is usually in the form of an oxide or hydroxide.

The catalytic composition and the mixed oxide may be used to reduce the amounts of $NO_x$ contained in an exhaust gas released by the internal combustion engine of a vehicle.

EXAMPLES

Experimental Techniques Used

The specific surface areas were determined automatically on a Flowsorb II 2300 or a Macsorb analyzer model I-1220. Prior to any measurement, the samples are carefully degassed to desorb any adsorbed volatile species. To do so, the samples may be heated at 200° C. for 2 hours in a stove, then at 300° C. for 15 min in the cell.

Diffractograms were obtained with a diffractometer Panalytical X'Pert Pro MPD under the following conditions: $\lambda=1.54$ Angstrom; tube voltage of 40 kV, tube current of 40 mA, scan speed of 1°/min, and sampling interval of 0.01°. Impregnation of the Mixed Oxide with Pt to Obtain a Mixed Oxide with Pt (1.0%) 9.9 g of the mixed oxide is impregnated with an aqueous solution of tetraamine platinum (II) hydroxide of formula $Pt(NH_2)_4(OH)_2$ (commercialized by Heraus) with the technique of incipient wetness impregnation. The obtained product is then dried at 120° C. for 12 hours and calcined in air at 500° C. for 4 hours. This results in a mixed oxide with platinum (1.0%=0.1 g of Pt/9.9 g of mixed oxide).

Hydrothermal Conditions Used

The following conditions were applied to evaluate the mixed oxide of the invention. 10.0 g of the mixed oxide with or without platinum (in the powder form) are compacted in the form of a pellet with a diameter of 32 mm by applying a pressure of 30 tons for 2 minutes. The pellet so obtained is deagglomerated in a mortar to provide a fine powder which is sieved so as to retain only the fraction of the powder which passes through a sieve of 250 μm and retained with a sieve of 125 μm. The obtained powder (2.2 g) is placed in a fixed bed reactor and then aged at a temperature of 800° C. in an atmosphere composed of 10.0 vol % $O_2$/10.0 vol % $H_2O$/the balance being $N_2$ flowing through the sample with a volumic flow-rate of 24 L/h (measured at 20° C. and 1 atm).

"Lean/Rich" Conditions Used

The following conditions were applied to evaluate the mixed oxide of the invention. 10.0 g of the mixed oxide with or without platinum (in the powder form) are compacted in the form of a pellet with a diameter of 32 mm by applying a pressure of 30 tons for 2 min. The pellet so obtained is deagglomerated in a mortar to provide a fine powder which is sieved so as to retain only the fraction of the powder which passes through a sieve of 250 μm and retained with a sieve of 125 μm. The obtained powder (0.8 g) is placed in a fixed bed reactor and then aged for 8 hours at a temperature of 720° C. in an atmosphere which alternates between A1 (90 s) and A2 (90 s). The atmospheres A1 and A2 are obtained by mixing alternatively measured quantities of $O_2$ or of CO in a gas composed of $H_2O$ and $N_2$. The total volumic flow-rate of A1 or of A2 is 24 L/h (20° C./1 atm).

A1: 2.7 vol % $O_2$/10.0 vol % $H_2O$/the balance being $N_2$

A2: 2.7 vol % CO/10.0 vol % $H_2O$/the balance being $N_2$.

Measurement of the $NO_x$ Storage

The following conditions were applied to evaluate the mixed oxide of the invention. A synthetic gas mixture (see composition below in Table I) is flushed at a flow-rate of 15 L/h (given at 20° C. /1 atm) during 90 min through 250.0 mg of the mixed oxide with or without platinum in a fixed bed reactor.

TABLE I

| gas | vol % |
|---|---|
| NO | 0.025 |
| $NO_2$ | 0.025 |
| $O_2$ | 8.0 |
| $H_2O$ | 10.0 |
| $CO_2$ | 10.0 |
| $N_2$ | balance |

The amount of $NO_x$ stored on the solid is monitored on line as a function of time via an on-line Antaris IGS FTIR spectrometer which is positioned after the fixed bed reactor and makes it possible to determine the composition of the gas exiting the reactor. Prior to the experiments, the spectrometer is calibrated with pure reference standards for each gas. Then during the experiment it is possible to record over time either the spectra of the gas exiting the reactor or the gas entering the reactor. It is thus possible to determine the amount of each gas retained or converted. In our experiments, $N_2O$ was not detected.

From these experiments, it is possible to calculate the amount of $NO_x$ "stored" by the mixed oxide and expressed as μg $NO_x$/g of mixed oxide for 90 min ($NO_x=NO+NO_2$).

Example 1

Preparation of a Mixed Oxide Cerium Oxide (86%), Zirconium Oxide (10%) and Lanthanum Oxide (4%)

A ceric nitrate solution (8.55 kg of in terms of $CeO_2$) with $Ce^{IV}$/total cerium>0.9 was introduced into a tank. The total volume of the solution was then adjusted to 180 L with the addition of pure water (deionized). The acidity of the aqueous solution after the addition of pure water and $HNO_3$ was 0.04 N. The aqueous solution was heated to 100° C., maintained at this temperature for 30 min, and allowed to cool down to the room temperature, to thereby obtain a suspension.

The suspension is allowed to settle in the tank and the mother liquor on the top was removed (112 L removed) from the suspension thus obtained (by doing so, 430 g of cerium in terms of $CeO_2$ were removed at the same time). 1.7 kg of a lanthanum nitrate solution (corresponding to 378 g in terms of $La_2O_3$) were added, and the total volume was adjusted to 180 L with pure water.

A DR of 42% was used. This value is based on the following calculations. The removal ratio is 0.38 (112 L removed from 180 L).

$$DR\ (\%)=[NO_3^-]_{step\ b}/[NO_3^-]_{step\ a}\times100=(F/G)/(D/E)\times100$$

$$D\ (mol)=8550/172.12\times[94.3/100\times4+(100-94.3)/100\times3]+8.0=203.9$$

$$F\ (mol)=(203.9\times0.38)+7.0=85.3$$

$$E=G=180\ L$$

$$DR=(85.3/180)/(203.9/180)\times100=42\ (\%)$$

The suspension containing the precursor of lanthanum oxide was then heated at 120° C. for 2 hours and the mixture was then allowed to cool. After cooling down of the suspension, 5.0 kg of zirconium oxynitrate solution (corresponding to 950 g in terms of $ZrO_2$) was added. An aqueous ammonia solution was also added to adjust the pH at 8.5.

The obtained slurry was subjected to solid-liquid separation through a press filter to obtain a filter cake. The cake was calcined in the air at 400° C. for 10 hours and ground by an hammer mill to obtain the mixed oxide in the form of a powder.

Example 2

Preparation of a Mixed Oxide Cerium Oxide (90%), Zirconium Oxide (5%) and Lanthanum Oxide (5%)

The mixed oxide of example 2 is prepared according to the same protocol as for example 1 except that the quantity of lanthanum nitrate solution was 2.0 kg (corresponding to 450 g in terms of $La_2O_3$) and the quantity of zirconium oxynitrate was 2.4 kg (corresponding to 450 g in terms of $ZrO_2$). The same DR as in example 1 was used.

The conditions applied in example 1 or in example 2 may also be similarly applied for a mixed oxide of a different composition according to the invention.

As can be seen from Table I, the mixed oxide according to the invention exhibits good thermal resistance under a calcination in air and under severe conditions while maintaining good $NO_x$ storage capacity despite the severe aging. See the values of $NO_x$ storage for ex. 1 and 2 in comparison to the values for the comparative examples. Similarly see the resistance to calcination in air or to aging.

The total pore volumes (mL/g) were also determined after the calcination in air at 900° C./5 h (Table III). The porosity is determined automatically on a micromeritics AutoPore IV 9500 with 200 mg of a sample. By this technique, mercury is introduced into the pores of the samples.

TABLE II

| | | specific surface* | | aging under "lean/rich" conditions (720° C./ 8 h/atmospheres A1/A2) | | | aging under hydrothermal conditions (800° C./16 h/atmosphere 10 vol % $O_2$/10 vol % $H_2O$/ the balance being $N_2$) | |
|---|---|---|---|---|---|---|---|---|
| | | after calcination in air | | specific | crystallite | $NO_x$ | specific | $NO_x$ |
| | example | 900° C./5 h | 1000° C./5 h | surface | size (nm) | storage | surface | storage** |
| 1 (I) | CeZrLa 86%-10%-4% | 42 | 24 | 53 | 9.3 | 17.3 | 48 | 13.9 |
| 2 (I) | CeZrLa 90%-5%-5% | 45 | 23 | 40 | 12.2 | 18.1 | 49 | 16.4 |
| 3 (C) | HSA20 pure ceria | 38 | 21 | 33 | 33.3 | 8.3 | 29 | 11.2 |
| 4 (C) | CeZr 58%-42% *** | / | 21 | 43 | 11.4 | 10.0 | 34 | 10.9 |
| 5 (C) | CeZrLa 86%-10%-4% *** | 32 | / | 36 | 11.9 | 10.4 | 36 | 10.3 |

(I): example according to the invention;
(C): comparative example
*specific surfaces are given in $m^2$/g
**$NO_x$ storage is given in µg $NO_x$/g mixed oxide after 90 min ($NO_x$ = NO + $NO_2$)
*** the comparative mixed oxides of examples 4 and 5 are prepared by a thermohydrolysis process

TABLE III

| example | | Total pore volume 900° C./5 h (mL/g)* |
|---|---|---|
| 1 (I) | CeZrLa 86%-10%-4% | 0.42 |
| 2 (I) | CeZrLa 90%-5%-5% | 0.39 |
| 3 (C) | HSA20 pure ceria | 0.72 |

The invention claimed is:

1. Mixed oxide consisting of a mixture of the oxides of cerium, of zirconium, of at least one rare-earth element other than cerium selected from Y, La, Pr, Nd and Gd, and optionally of an oxide of hafnium, with the following proportions by weight, expressed as oxides:
   zirconium: up to 20.0%;
   the rare-earth element(s) other than cerium: up to 20.0%;
   the remainder as cerium, the proportion of cerium being at least 70.0%;
   characterized in that the mixed oxide exhibits each of the following independently measured characteristics:
     a specific surface area of at least 35 m2/g after calcination in air at 900° C. for 5 hours;
     a specific surface area of at least 20 m2/g after calcination in air at 1000° C. for 5 hours; and
     a specific surface area of at least 45 m2/g after aging at 800° C. for 16 hours in an atmosphere composed of 10.0 vol % $O_2$/10.0 vol % $H_2O$/the balance being $N_2$.

2. Mixed oxide consisting essentially of a mixture of the oxides of cerium, of zirconium, of at least one rare-earth element other than cerium selected from Y, La, Pr, Nd and Gd, and optionally of an oxide of hafnium, with the following proportions by weight, expressed as oxides:
   zirconium: up to 20.0%;
   the rare-earth element(s) other than cerium: up to 20.0%;
   the remainder as cerium, the proportion of cerium being at least 70.0%;
   characterized in that the mixed oxide exhibits each of the following independently measured characteristics:
     a specific surface area of at least 35 $m^2$/g after calcination in air at 900° C. for 5 hours;
     a specific surface area of at least 20 $m^2$/g after calcination in air at 1000° C. for 5 hours; and
     a specific surface area of at least 45 $m^2$/g after aging at 800° C. for 16 hours in an atmosphere composed of 10.0 vol % $O_2$/10.0 vol % $H_2O$/the balance being $N_2$.

3. The mixed oxide according to claim 1 characterized in that it exhibits a specific surface area of at least 35 $m^2$/g after aging at 720° C. for 8 hours in an atmosphere which is alternatively:

an atmosphere A1 composed of 2.7 vol % $O_2$/10.0 vol % $H_2O$/the balance being $N_2$ and applied for 90 seconds; then an atmosphere A2 composed of 2.7 vol % CO/10.0 vol % $H_2O$/the balance being $N_2$ and applied for another 90 seconds;

the cycle of the alternating atmosphere A1-A2 being repeated for the whole 8 hours of the aging.

4. The mixed oxide according to claim 1 characterized in that, after aging at 720° C. for 8 hours in an atmosphere which is alternatively:

an atmosphere A1 composed of 2.7 vol % $O_2$/10.0 vol % $H_2O$/the balance being $N_2$ and applied for 90 seconds; then an atmosphere A2 composed of 2.7 vol % CO/10.0 vol % $H_2O$/the balance being $N_2$ and applied for another 90 seconds;

the cycle of the alternating atmosphere A1-A2 being repeated for the whole 8 hours of the aging, the average size of the crystallites of cerium oxide is lower than 15 nm this size being determined on an XRD-diffractogram from the reflexion located at 28.8°±1°.

5. The mixed oxide according to claim 1 characterized by the following proportions:

zirconium: from 1.0% to 12.0%;

the rare-earth element(s) other than cerium: from 3.0% to 10.0%;

the remainder as cerium, the proportion of cerium being at least 80.0%.

6. The mixed oxide according to claim 1 characterized in that it comprises only one rare-earth element other than cerium or comprises a combination of two rare-earth elements other than cerium.

7. The mixed oxide according to claim 1 characterized in that the mixed oxide comprises only lanthanum as the rare-earth element other than cerium and:

the proportion of zirconium is from 4.0% to 6.0% and the proportion of lanthanum is from 4.0% to 6.0%; or the proportion of zirconium is from 9.0% to 11.0% and the proportion of lanthanum is from 3.0% to 5.0%.

8. The mixed oxide according to claim 1 characterized in that it also comprises hafnium.

9. The mixed oxide according to claim 8 characterized in that the proportion of hafnium is lower or equal to 2.5% this proportion being expressed by weight and as $HfO_2$ with respect to the mixed oxide as a whole.

10. A method for preparing the mixed oxide of claim 1, the method comprising the following steps:

step (a): heating an aqueous solution comprising $Ce^{IV}$, optionally $CE^{III}$, $H^+$ and $NO_3^+$ with a molar ratio $Ce^{IV}$/total cerium of at least 0.9 at a temperature between 60° C. and 170° C. to obtain a suspension comprising a liquid medium and a precipitate;

step (b): allowing solid from the suspension obtained at the end of step (a) to settle and partially removing liquid from the suspension, adding nitrate(s) of the rare earth element(s) to the suspension and optionally adding water to adjust the total volume;

step (c): heating the mixture obtained at the end of step (b);

step (d): adding an aqueous solution of zirconium oxynitrate to the mixture obtained at the end of step (c) and adding an aqueous solution of a basic compound to adjust the pH of the mixture to at least 7.0;

step (e): recovering a precipitate from the mixture obtained at the end of step (d) and optionally drying to remove partly or completely any water which is present;

step (f): calcining the solid obtained at the end of the step (e) in air at a temperature between 300° C. and 800° C.;

step (g): optionally grinding the solid obtained from step (f) to reduce the size of the particles;

wherein the method is characterized by a decrease ratio (DR) between 10% and 90%, DR being given by formula (I):

$$DR=[NO_3^-]_{step\ b}/[NO_3^-]_{step\ a}\times 100 \qquad (I)$$

where $[NO_3^-]_{step\ b}$ is the concentration in mol/L of the nitrate anions in the aqueous solution of cerium used in step (a);

and $[NO_3^-]_{step\ b}$ is concentration in mol/L of the nitrate anions in the liquid medium of the suspension obtained at the end of step (b).

11. The method of claim 10 wherein the aqueous solution used in step (a) contains $Ce^{IV}$, optionally $Ce^{III}$, $H^+$ and $NO_3^-$.

12. The method according to claim 10 wherein the amount of $H^+$ in the aqueous solution used in step (a) is between 0.01 and 1.0 N.

13. A mixed oxide obtainable by the method of claim 10.

14. A catalytic composition comprising at least one mixed oxide according to claim 1.

15. The catalytic composition according to claim 14 further comprising at least one alumina (optionally doped), at least one catalytic metal selected from Pt, Pd and Rh and mixtures thereof, and optionally a material M based on an alkaline metal or an alkaline earth metal.

16. A lean $NO_x$ trap comprising a mixed oxide according to claim 1 as a component of a catalytic composition.

17. A method for converting NO to $N_2$ in an exhaust gas released by an internal combustion engine, the method comprising contacting the exhaust gas with the lean $NO_x$ trap of claim 14.

18. A method of treating an exhaust gas released by an internal combustion engine, the method comprising contacting the exhaust gas with the catalytic composition of claim 14 wherein in a first mode of operation, the engine is operated under lean conditions to convert NO into $NO_2$ that is adsorbed by a trapping material present in the catalytic composition and in a second mode of operation, the engine is operated under rich conditions to convert the adsorbed species into $N_2$.

19. A method of treating an exhaust gas released by an internal combustion engine of a vehicle, the method comprising contacting the exhaust gas with a catalytic composition of claim 14.

* * * * *